(12) United States Patent
Huang et al.

(10) Patent No.: US 8,420,746 B2
(45) Date of Patent: Apr. 16, 2013

(54) BIODEGRADABLE COMPOSITION AND FOAM ARTICLE MADE THEREFROM

(75) Inventors: Chien-Ming Huang, Taichung (TW); Yu-Kai Huang, Taichung County (TW)

(73) Assignee: Minima Technology Co., Ltd, Taichung (TW)

( * ) Notice: Subject to any disclaimer, the term of this patent is extended or adjusted under 35 U.S.C. 154(b) by 231 days.

(21) Appl. No.: 12/943,291

(22) Filed: Nov. 10, 2010

(65) Prior Publication Data
US 2012/0053259 A1 Mar. 1, 2012

(30) Foreign Application Priority Data

Sep. 1, 2010 (TW) ................................ 99129473 A

(51) Int. Cl.
*C08F 20/10* (2006.01)
*C08G 63/20* (2006.01)
*C08G 63/91* (2006.01)
*C08J 9/00* (2006.01)

(52) U.S. Cl.
USPC ........... 525/445; 521/134; 521/182; 525/437; 525/448

(58) Field of Classification Search .................. 521/134, 521/182; 525/445, 448, 437
See application file for complete search history.

(56) References Cited

U.S. PATENT DOCUMENTS 6,500,897 B2 * 12/2002 Wang et al. ..................... 525/55
7,892,113 B2 * 2/2011 Egashira et al. ............... 473/377

FOREIGN PATENT DOCUMENTS
EP 1449869 A1 * 8/2004

* cited by examiner

*Primary Examiner* — Randy Gulakowski
*Assistant Examiner* — Kara Boyle
(74) *Attorney, Agent, or Firm* — Reed Smith LLP

(57) ABSTRACT

A biodegradable composition includes: a polymer component including a first polymer of polybutylene-1,4-succinate (PBS); and a cross-linking agent capable of producing a free radical to allow the polymer component to be subjected to a free radical cross-linking reaction in such a condition that the biodegradable composition has a melt index ranging from 1.5 to 3.0.

6 Claims, No Drawings

BIODEGRADABLE COMPOSITION AND FOAM ARTICLE MADE THEREFROM

CROSS-REFERENCE TO RELATED APPLICATION

This application claims priority of Taiwanese application No. 099129473, filed on Sep. 1, 2010.

BACKGROUND OF THE INVENTION

1. Field of the Invention

This invention relates to a biodegradable composition and a foam article made therefrom.

2. Description of the Related Art

Expanded polystyrene (EPS) has become a widely used foam material because of the properties of water tolerance, thermal-resistivity, insulativity, low hygroscopicity, anti-shock, and light weight. In addition, the manufacture of EPS into foam products is simple and relatively inexpensive.

However, the EPS products are stable in natural environment and can not be degraded for hundreds of years. Discarded EPS products therefore are not recycled and result in serious environmental impact.

In order to overcome the aforesaid drawback associated with EPS, other foam polymers, such as polylactic acid (PLA) and polybutylene-1,4-succinate (PBS), are used. PLA and PBS are biodegradable polymers and have relatively mild environmental impact. However, the glass transition temperature of polylactic acid is only about 60° C., which is too low, and thereby results in poor thermal-resistivity. The foam product made from PLA may deform when used under an elevated temperature. Moreover, each of PLA and PBS has a relatively high melt index (M.I.), i.e., 4-4.5 and 4.5 respectively, that results in lower melt strength and inferior gas barrier. During manufacture of foam products made from PLA or PBS, foaming failure phenomenon appears during the foaming process and thus the yield is adversely influenced.

SUMMARY OF THE INVENTION

Therefore, the object of the present invention is to provide a biodegradable composition that can overcome the aforesaid drawbacks associated with the prior art.

According to one aspect of the present invention, a biodegradable composition includes: a polymer component including a first polymer of polybutylene-1,4-succinate (PBS); and a cross-linking agent capable of producing a free radical to allow the polymer component to be subjected to a free radical cross-linking reaction in such a condition that the biodegradable composition has a melt index ranging from 1.5 to 3.0. According to another aspect of the present invention, there is provided a foam article made from the aforementioned biodegradable composition.

DETAILED DESCRIPTION OF THE PREFERRED EMBODIMENTS

According to the preferred embodiments of the present invention, a biodegradable composition includes a polymer component, a cross-linking agent, and a foaming agent. The cross-linking agent is capable of producing free radicals such that the polymer component can be subjected to a free radical cross-linking reaction in such a condition that the biodegradable composition has a melt index ranging from 1.5 to 3.0.

The polymer component includes a first polymer of polybutylene-1,4-succinate (PBS) and an optional second polymer selected from the group consisting of polylactic acid (PLA), polybutyrate adipate terephthalate (PBAT), and the combination thereof.

PBS has a mechanical property similar to that of linear low-density polyethylene (LLDPE). Thus, PBS has a superior mechanical property compared to other biodegradable materials and provides good durability to a foam article made therefrom. Furthermore, PBS has a high heat deflection temperature (HDT) of up to about 90° C., and thus a foam article made therefrom exhibits good thermal-resistance and improved resistance to deformation at an elevated temperature. In addition, PBS can be easily processed into foam articles in various forms through conventional foaming techniques.

In the biodegradable composition of this invention, the second polymer in the polymer component is used to improve the physical properties of the foam article made from the biodegradable composition. For example, the rigidity and the dimensional stability of the foam article can be improved by virtue of PLA. PBAT can be used to improve the toughness and the flexibility of the foam article.

In this invention, in order to ensure the durability and thermo-resistivity of the foam article, the first polymer, i.e., PBS, is not less than 53 parts by weight based on 100 parts by weight of the polymer component. Preferably, the first and second polymers of the polymer component are respectively in amounts of 53-100 parts by weight and 0-47 parts by weight, and more preferably, are respectively in amounts of 70-100 parts by weight and 0-30 parts by weight, based on 100 parts by weight of the polymer component.

The cross-linking agent used in the present invention is used to cross-link the first polymers and/or second polymers, while producing free radicals to function as an initiator for a cross-linking reaction. To be specific, the cross-linking agent can be used to increase grafting and cross-linking of the polymers of the polymer component, thereby resulting in a decrease in melt index to be within 1.5 to 3.0 and an increase in melting strength of the biodegradable composition. Thus, the foam article made from the biodegradable composition of this invention exhibits a relatively high mechanical strength, thermal-resistivity, and solvent-resistivity.

Preferably, the cross-linking agent is a peroxide selected from the group consisting of dicumyl peroxide 2,5-dimethyl-2,5-di(tert-butylperoxy)hexane, and 3,6,9-triethyl-3,6,9-trimethyl-1,4,7-triperoxonane. In view of environmental consideration, the peroxide used in the preferred embodiments of this invention is 2,5-dimethyl-2,5-di(tert-butylperoxy)hexane or 3,6,9-triethyl-3,6,9-trimethyl-1,4,7-triperoxonane.

The type of the foaming agent should not be limited to a specific one. A physical foaming agent having relatively mild environmental impact is preferred. In the embodiments of this invention, the foaming agent is butane or carbon dioxide. The foaming magnification of the biodegradable composition and the mechanical strength of the final foam article may be adjusted by controlling the amount of the foaming agent.

Moreover, the biodegradable composition further includes optional grafting component used to react with the peroxide and the polymer component so as to form a branch group in the polymers of the polymer component, thereby resulting in a decrease in melt index and an increase in the melting viscosity and the melting strength of the biodegradable composition. Preferably, the grafting component is selected from the group consisting of butyl acrylate (BA), vinyl acetate (VAc), and the combination thereof.

Preferably, the polymer component, the foaming agent, the peroxide, and the grafting component are respectively present in an amount of 100 parts by weight, 10-16 parts by weight, 0.03-0.05 parts by weight, and 0-2 parts by weight.

Besides, the biodegradable composition may further include a filler, such as calcium carbonate, mica, clay, a silicate, and talc. In the examples of this invention, a talc powder is used as the filler.

The biodegradable composition of the present invention can be used to prepare different foam articles according to the melt index thereof. For example, the composition having a melt index ranging from 1.5 to 2.5 exhibits relatively high melting strength and melting viscosity, and thus is suitable for making a foam article with closed cells, such as a packaging article, a floating board, etc. The composition having a melt index ranging from 2.5 to 3.0 exhibits relatively low melting strength and melting viscosity, and thus is suitable for making a foam article with open cells, such as a building material capable of absorbing sounds.

It should be noted that the biodegradable composition may be processed to manufacture a biodegradable foam article using a conventional process and apparatus. For example, a foam plate can be manufactured using a tandem extruder. The biodegradable composition can be used to prepare a foamable resin particle through granulation without foaming. The foamable resin particle can be further processed into a foam article. For example, the biodegradable composition can be processed to manufacture foamable resin particles by granulation in water and using a double screw extruder.

EXAMPLES

Formulas of the biodegradable compositions in Examples 1 to 4 of the present invention (E1 to E4), which are respectively used to prepare specimens A to D and which have melt indices (M.I.) within 1.5 to 3.0, are shown in Table 1. Formulas of the biodegradable compositions in comparative Examples 1 to 3 (CE1 to CE3), which have melt indices outside the range of 1.5 to 3.0, are also shown in Table 1.

PBS was commercially available from Mitsubishi Chemical Industries, Ltd. under a trade name of GS pla AZ91. The peroxide was 2,5-dimethyl-2,5-di(tert-butylperoxy)hexane. The grafting polymer was butyl acrylate (BA). The foaming agent was butane.

TABLE 1

| | Polymer component (parts by weight) | | | Foaming agent (parts by weight) | Talc powder (parts by weight) | Peroxide (parts by weight) | Grafting component (parts by weight) | |
|---|---|---|---|---|---|---|---|---|
| | First polymer | Second polymer | | | | | | |
| | PBS | PLA | PBAT | | | | | M.I. |
| E1 | 100 | 0 | 0 | 15 | 0.5 | 0.03 | 0 | 3.0 |
| E2 | 70 | 0 | 30 | 15 | 0.5 | 0.03 | 0 | 2.4 |
| E3 | 68 | 23 | 9 | 15 | 0.5 | 0.05 | 2 | 2.99 |
| E4 | 53 | 17 | 30 | 15 | 0.5 | 0.05 | 2 | 1.5 |
| CE1 | 100 | 0 | 0 | 15 | 0.5 | 0.01 | 0 | 3.5 |
| CE2 | 53 | 17 | 30 | 15 | 0.1 | 0.1 | 2 | 1.2 |
| CE3 | 100 | 0 | 0 | 15 | 0.5 | 0 | 0 | 4.5 |

The melt index of each of the biodegradable compositions in E1 to E4 and CE1 to CE3 was determined based on ASTM D1238 and the results are shown in Table 1. The biodegradable compositions of E1 to E4 and CE1 to CE3 were used to prepare specimens.

Based on the experimental results, the biodegradable compositions of E1 to E4 of this invention can be successfully used to prepare specimens, i.e., specimens A to D, in Table 2.

The test results of the physical properties for the specimens A to D are shown in Table 2. It is apparent from Table 2 that the property results for the specimens A to D meet the industrial requirements.

Moreover, from the results of water absorption, it is indicated that, when the M.I. ranges from 1.5 to 2.5, i.e., E2 and E4, the water absorption is relatively low and the foam specimen has closed cells. When the M.I. ranges from 2.5 to 3.0, i.e., E1 and E3, the water absorption becomes higher and the foam specimen has open cells.

However, when the biodegradable composition has a M.I. larger than 3.0, i.e., CE1 and CE3, the foam breaking phenomenon appears during the foaming process, and a specimen made therefrom has poor physical properties and is not suitable to manufacture a foam article. Moreover, when the biodegradable composition has a M.I. lower than 1.5, i.e., CE2, undesired cross-linking gel appears on a surface of a specimen made therefrom, and the specimen has poor physical property and cannot be used to manufacture a foam article. The physical properties of specimens CE1 to CE3 were not tested.

TABLE 2

| | Specimen | | | |
|---|---|---|---|---|
| | A | B | C | D |
| Density (g/cm$^3$) (ASTM D3574) | 0.09 | 0.062 | 0.075 | 0.051 |
| Hardness (ASTM D2240) | 45 | 40 | 51 | 42 |
| Tensile Strength (Kgf/cm$^2$) (ASTM D638) | 12.5 | 16.0 | 13.4 | 16.4 |
| Elongation Ratio (%) (ASTM D638) | 19.9 | 28 | 11.5 | 15 |
| Tear Strength (kg/cm) (CNS 3559) | 5.7 | 7.0 | 4.8 | 5.8 |
| Compression Set (%) (ASTM D395 (B)) | 73.6 | 55 | 78 | 65 |
| Shrinkage (%) (ASTM D1917) | 0 | 3 | 8 | 7 |
| Water Absorption (%) (ASTM D1056) | 61 | 15 | 25 | 12 |

By use of the cross-linking agent capable of producing free radicals together with the polymer component to control the melt index of the biodegradable composition so as to be within 1.5 to 3.0, the biodegradable composition has good foaming effect and the foam article made from the biodegradable composition exhibits good physical properties.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A biodegradable composition comprising:
    a polymer component including a first polymer of polybutylene-1,4-succinate (PBS);
    a cross-linking agent capable of producing a free radical to allow said polymer component to be subjected to a free radical cross-linking reaction in such a condition that said biodegradable composition has a melt index ranging from 1.5 to 3.0; and
    a grafting component selected from the group consisting of butyl acrylate (BA), vinyl acetate (VAc), and the combination thereof;
    wherein said cross-linking agent is a peroxide selected from the group consisting of dicumyl peroxide (DCP), benzoyl peroxide(BPO), 2,5-dimethyl-2,5-di(tert-butylperoxy) hexane, and 3,6,9-triethyl-3,6,9-trimethyl-1,4,7-triperoxonane.

2. The biodegradable composition of claim 1, further comprising a foaming agent.

3. The biodegradable composition of claim 2, wherein said polymer component, said foaming agent, said peroxide and said grafting component are respectively present in an amount of 100 parts by weight, 10-16 parts by weight, 0.03-0.05 parts by weight, and not more than 2 parts by weight.

4. The biodegradable composition of claim 1, wherein said polymer component further includes a second polymer selected from the group consisting of polylactic acid (PLA), polybutyrate adipate terephthalate (PEAT), and the combination thereof.

5. The biodegradable composition of claim 4, wherein said first and second polymers of said polymer component are respectively present in an amount of not less than 53 parts by weight and not greater than 47 parts by weight based on 100 parts by weight of said polymer component.

6. A foam article made from a biodegradable composition according to claim 1.

* * * * *